(12) United States Patent
Schulzki et al.

(10) Patent No.: US 11,447,347 B2
(45) Date of Patent: Sep. 20, 2022

(54) CONVEYOR

(71) Applicant: Wipotec GmbH, Kaiserslautern (DE)

(72) Inventors: Alexander Schulzki, Stelzenberg (DE);
Matthias Joachim, Pirmasens (DE);
Stephan Clößner, Ehringshausen (DE);
Christoph Eckhardt, Breidenbach
(DE); Jochen Gerlach, Dautphetal
(DE)

(73) Assignee: Wipotec GmbH, Kaiserslautern (DE)

( * ) Notice: Subject to any disclaimer, the term of this patent is extended or adjusted under 35 U.S.C. 154(b) by 93 days.

(21) Appl. No.: 16/859,911

(22) Filed: Apr. 27, 2020

(65) Prior Publication Data

US 2020/0361712 A1 Nov. 19, 2020

(30) Foreign Application Priority Data

May 3, 2019 (DE) .................. 202019102508.5

(51) Int. Cl.
*B65G 47/88* (2006.01)
*B65G 17/00* (2006.01)
(Continued)

(52) U.S. Cl.
CPC ....... *B65G 47/8815* (2013.01); *B23Q 7/1447* (2013.01); *B65G 17/002* (2013.01);
(Continued)

(58) Field of Classification Search
CPC ...... B65G 17/002; B65G 35/06; B65G 47/88; B65G 47/8815; B65G 47/8869;
(Continued)

(56) References Cited

U.S. PATENT DOCUMENTS 2,903,120 A * 9/1959 Thomas ............... B23Q 7/1489
198/345.3
3,858,707 A * 1/1975 Block .................. B23Q 7/1426
104/166
(Continued)

FOREIGN PATENT DOCUMENTS

CH 695561 A5 6/2006
DE 20 2005 017 255 U1 1/2006
(Continued)

OTHER PUBLICATIONS

Extended European Search Report issued by the EPO dated Sep. 23, 2020, in European patent application No. 20171889.7, with partial English translation.
(Continued)

*Primary Examiner* — Gene O Crawford
*Assistant Examiner* — Keith R Campbell
(74) *Attorney, Agent, or Firm* — The Culbertson Group, P.C.

(57) ABSTRACT

A conveyor and process for transporting products, wherein a carrier with an associated product holder can be moved along a conveying path by means of a conveyor element. In a processing position, the carrier can be aligned by means of first alignment elements, and second alignment elements are provided for aligning the product holder for disengagement from the carrier.

17 Claims, 5 Drawing Sheets

(51) Int. Cl.
*B65G 17/32* (2006.01)
*B23Q 7/14* (2006.01)
*G01G 19/03* (2006.01)
*B65G 35/06* (2006.01)

(52) U.S. Cl.
CPC .............. *B65G 17/32* (2013.01); *B65G 35/06* (2013.01); *B65G 47/8869* (2013.01); *G01G 19/035* (2013.01); *B65G 2203/0216* (2013.01); *B65G 2203/0258* (2013.01); *B65G 2203/04* (2013.01); *B65G 2811/0621* (2013.01)

(58) Field of Classification Search
CPC .... B65G 2203/0216; B65G 2203/0258; B65G 2811/0621; B23Q 7/1447; B23Q 7/1452; B23Q 7/18
See application file for complete search history.

(56) References Cited

U.S. PATENT DOCUMENTS

| | | | | |
|---|---|---|---|---|
| 3,990,212 | A * | 11/1976 | Flodin | B65B 1/32 53/502 |
| 4,201,284 | A * | 5/1980 | Brems | B23Q 7/1426 198/345.3 |
| 4,570,782 | A * | 2/1986 | Cargill | B65G 29/00 198/345.3 |
| 4,611,676 | A * | 9/1986 | Meiring | G01G 3/1414 177/145 |
| 6,414,251 | B1 | 8/2002 | Edwards | |
| 8,430,229 | B2 * | 4/2013 | Abbestam | B23Q 7/1447 198/463.3 |
| 8,525,051 | B2 * | 9/2013 | Hauck | G01G 21/30 177/124 |
| 10,737,403 | B2 * | 8/2020 | Bauer | B65G 47/682 |
| 2018/0086564 | A1 * | 3/2018 | Clossner | B65G 54/02 |

FOREIGN PATENT DOCUMENTS

| | | |
|---|---|---|
| DE | 10 2016 207 60 A1 | 11/2017 |
| EP | 3290152 A1 | 3/2008 |
| EP | 3059561 A1 | 8/2016 |
| WO | 2014206752 A1 | 12/2014 |

OTHER PUBLICATIONS

Search report issued by the German Patent Office in DE 20 2019 102 508.5, with complete English translation.

* cited by examiner

CONVEYOR

TECHNICAL FIELD OF THE INVENTION

The present invention relates to conveyors for transporting products, particularly to one or more processing stations. The present invention also relates to processes for aligning conveyed products for processing.

BACKGROUND OF THE INVENTION

Industrial facilities for the production or packaging of goods often comprise conveyor lines along which the goods are transported successively to different processing stations. Such processing stations can include in particular sorting machines, weighing machines, packaging and inspection machines and marking devices. Further devices known to a person skilled in the art are also conceivable for handling the products appropriately depending on the desired processing.

The products are moved to the individual processing stations by means of a conveyor. Special conveying members (drivers, hooks etc.) are moved along a conveyor element, for example a rail, in a conveying direction and can themselves be coupled to individual carriers. Each carrier is formed to receive one or more products. It is also possible for a carriage or cart, or a group of carriages or carts, driven by a conveyor chain or a cable, to serve as a carrier. Products may be received indirectly or directly such a carrier for transporting the products into the individual processing stations and out again, for example.

The carriers transported along the conveyor line are usually tailored to the goods to be transported in each case and have particular contours or dimensions in order to be able to receive and transport the goods securely. The carriers can be connected to the conveying members by simple insertion, screwing, snapping-in etc. The carrier makes it possible to transport different products with the same conveyor by, for example, the upper area of the carrier being formed to receive different products, while the underside is formed to couple to the members of a conveying device.

It is further known to provide specific product holders for the individual carriers. The product holders can be placed on the carriers or inserted into them and serve to directly receive the product to be transported. A product holder can be formed for laying sausage or cheese slices on, for example. Product holders for receiving pourable or free-flowing products are also known.

The carriers mainly have the task of transporting goods along the conveyor line without there being particular requirements for the highly precise positioning of the carriers during the transport or also at the individual processing stations. As a rule, it is sufficient to position the goods transported by the carriers in the individual processing stations within presettable rough tolerances in order, for example, to be able to package the products there or radiograph them for inspection purposes. If the carriers are transported along a rail, for example, as a rule the positioning accuracy which results from the coupling between the rail and the carrier is sufficient in the individual processing stations. Positioning inaccuracies can result due to an existing mechanical play between rail and carrier transverse to the conveying direction (sometimes referred to as the "Y direction" in the following). Positioning tolerances can also occur in the conveying direction (sometimes referred to as the "X direction" in the following), for instance when the carriers are driven by a chain with play, a gear mechanism or a spindle. Such positioning tolerances are acceptable for a range of processing stations.

However, difficulties arise when the products in a processing station need to be positioned very precisely in the space. This applies, for example, to a processing station designed as a weighing machine, with which the weight of the goods transported by the carriers is to be measured. In order to be able to weigh a product in a processing station formed as a weighing machine, it is expedient to "release" the product (possibly together with a known preload). By this is meant the situation where the weight force of the product (possibly with preload) is introduced fully into the load receiver of a weigh cell of the weighing machine without a positive-locking or friction-locking connection remaining between the product and a component not to be weighed with it, a carrier for example.

In practice, the product holder received by the carrier often forms a preload and is thus weighed together with the product. For weighing, the product holder must therefore be completely decoupled ("released") from the carrier allocated to it in order to prevent a force shunt and thus a distorted weighing result.

In order to reliably achieve the release of the product holder from the carrier, first of all the position of the carrier in the space, in particular in the X-Y plane, must be preset or known within narrow tolerances so that the product holder can be lifted out of the carrier as centrally as possible during the subsequent release, without tilting or shifting in the process. Only then can the release be achieved by a relative movement between the carrier and the product holder which is as simple, small and quick as possible. The rough tolerances with which carriers known from the state of the art are moved along the conveyor line are therefore unsuitable for aligning the product holders transported with the carriers sufficiently precisely.

SUMMARY OF THE INVENTION

An object of the invention is to provide a device and a process with which the carriers can be aligned so precisely that a subsequent release of the product holder relative to the carrier is possible simply and quickly.

According to one aspect of the invention a first alignment means is provided for aligning the carrier by transferring a carrier which has entered a processing position along the conveyor line into a presettable target carrier position. This alignment occurs by impingement on and movement of the carrier relative to the conveyor or another component, which is fixed in the space at least with regard to its position in a horizontal plane. In addition to the only rough positioning which the carrier experiences via its coupling to the components of the conveyor, the first alignment means according to the invention guarantees the transfer of the carrier which has entered the processing position into the precisely presettable target carrier position. The carrier can thus be displaced and/or tilted relative to the conveyor or a component connected thereto in order to make it possible to subsequently, and in a simple manner, release the product holder received by the carrier. The coupling between the conveyor and the carrier is preferably chosen within rough tolerances such that the precise alignment of the carrier brought about by the first alignment means ranges within these tolerances.

The first alignment means, which is formed at least partially movable, expediently comprises at least one movable alignment element. For alignment, the alignment element can impinge on and displace or tilt the carrier after reaching the processing position. The alignment element expediently has contact surfaces which engage with the carrier when the alignment element moves relative to the carrier and, as the movement is continued, exert forces on the carrier in order to displace and/or tilt it into the desired target carrier position.

The movement of the first alignment means relative to the carrier can be effected, for example, by a linear drive or another electromechanical drive means known to a person skilled in the art. The alignment can also occur utilizing the movement of the carrier along the conveying path, for instance by lateral guide means impinging on the carrier as it moves into the processing position. The precise alignment of the carrier in the X direction can be achieved, for example, by a limit stop at the processing position which can be pivoted into the conveying path. After reaching the limit stop, the carrier is also precisely positioned in the Y direction because of the lateral guide means. An alternative embodiment, preferred in the following, in contrast provides that the first alignment means do not cooperate with the carrier until it has reached the processing position and is already pausing there. In this case, the processing position is only defined within rough tolerances, and the carrier can still be displaced in particular in the X and in the Y direction.

Some embodiments of the invention may provide that the first alignment means comprises at least one bolt formed about a longitudinal axis, which, for alignment of the carrier, can be moved in against a guide surface on the carrier, preferably into a recess or into an opening or hole in the carrier. The bolt and the guide surfaces on the carrier cooperating with it are designed such that a movement of the bolt in a first direction (in particular in a direction Z perpendicular to the X-Y plane) simultaneously aligns the carrier in the two directions X and Y perpendicular to the Z direction. This can be advantageously achieved by the bolt having a conical tip, which is introduced into the recess in the carrier, wherein, as the Z height of the bolt increases, the conical surface approaches the contact surfaces of the recess in the carrier until they touch, in order to then exert horizontal displacement forces from the conical surface of the bolt onto the contact surfaces of the carrier and to displace the carrier accordingly. The bolt is preferably fixed with regard to its X and Y position, whereas the carrier is variable, and thus can be aligned, in the X-Y plane, thus also relative to the conveyor, to the required extent. Several bolts or comparable alignment elements spaced apart from each other can simplify the alignment of the carrier further, since a specific rotational position in the X-Y plane is thus also presettable.

Embodiments of the invention may further provide a second alignment means which is operable to transfer (release) the product holder into a presettable target product holder position relative to the carrier, which is defined at least with respect to its X and Y position. It is thus possible according to the invention, after previously aligning the carrier in the space, now to release the product holder from the carrier in order to carry out the weighing procedure.

Whereas the first alignment means serves to align the conveyor's carrier, which is not also to be weighed, precisely in the space for the later release of the product holder, the second alignment means preferably serves to release the product holder relative to the carrier. Alternatively, however, it can also be enough to actuate only the second alignment means to completely release the product holder in the carrier if the processing position taken up only within rough tolerances by the carrier is sufficient in any case to reliably bring about the release of the product holder from the carrier.

Alignment surfaces or contours (also referred to herein as contact surfaces) may be provided on the product holder which are formed for interaction with a centering unit moved relative to the product holder. The centering unit and alignment surfaces together form the second alignment means. The second alignment means can be formed analogous to the first alignment means such that, as part of a relative movement between centering unit and product holder, contact surfaces of both components approach each other and touch, in order, in particular in the X-Y plane, to exert forces on the product holder and align it. For example, on a side facing the carrier, the product holder could be provided with conically running surfaces which cooperate with suitable guide surfaces or edges of the carrier and thus position the product holder precisely in the carrier and relative to it.

Alternatively, however, it is also conceivable to form the second alignment elements simply as stop elements acting against each other, which are used to lift the product holder out of the carrier. If the product holder is arranged in the carrier such that a mechanical separation of the product holder from the carrier is simultaneously achieved by vertically lifting the product holder out of the carrier, this is already enough for the release. In this case, the centering unit is not used for centering (thus for the horizontal alignment of the product holder relative to the centering unit), but merely for raising the product holder in the Z direction, without the position of the product holder in the space being changed in the X or Y direction.

Some embodiments of the invention may further include a weigh cell, which is formed to measure the weight of a product holder which is loaded with product or unloaded and, in the processing position, is released from its associated carrier, wherein the weigh cell has a load introducing section, comprising the centering unit, for introducing the load to be weighed into the weigh cell. The weigh cell has the task of weighing the products transported along the conveying path. For this purpose, the product holders receiving the products must be released in the manner described above. The weight force to be determined is introduced into the load introducing section of the weigh cell by the product holder and is converted into an analyzable signal by a mechanism known to a person skilled in the art inside the weigh cell.

The load introducing section preferably includes the centering unit, with which the product holder is released relative to the carrier. The product holder is then released by first of all aligning the carrier in the space by the first alignment means. As part of this alignment, the carrier (with the product holder received by it) is aligned in the processing position such that the product holder is positioned relative to the centering unit for the subsequent releasing procedure such that the release can be effected solely with the aid of a relative movement between centering unit and product holder. The weigh cell, with its load introducing section including the centering unit, is formed displaceable to the extent that the weight force of the product holder is introduced into the load introducing section free of force shunt (release) or is decoupled therefrom (the product holder rests on the carrier).

The releasing procedure can preferably be effected such that the weigh cell, with its load introducing section and the centering unit arranged thereon, is moved towards the product holder in order to thereby receive the product holder and to disengage it from the carrier. For this purpose, the weigh cell is expediently arranged on a lifting device, with the result that it is movable (preferably from below), with its load introducing section, upwards towards the product holder in order to lift the latter out of the carrier. In the reverse motion sequence, the weigh cell descends again, with the result that the product holder is received by the carrier again. As soon as the centering unit is separated sufficiently far from the product holder and, if necessary, the first alignment means has also been disengaged from the carrier, the carrier together with the product holder can be moved along the conveying path to the next processing station.

Alternatively, the product holder could also be lowered onto a substantially fixed weigh cell. However, the result of this would be that the carrier carrying the product holder would also have to be lowered with it, which is difficult in terms of construction, but not impossible.

According to some embodiments of the invention, the conveyor is formed such that the release is brought about through alignment of the carrier in the space by means of first alignment elements, with alignment or release of the product holder relative to the carrier by means of the second alignment elements following this or overlapping in time or simultaneously. An implementation of the invention may provide that one part of the first alignment elements (in particular the above-named bolt) is fixedly, or largely fixedly, coupled to the weigh cell, with the result that these alignment elements engage with the carrier to be aligned through preferably vertical movement of the weigh cell and align it or transfer it into the target carrier position. In this case, parts of both the first alignment means (for example the bolt) and the second alignment means (namely the centering unit) are arranged on the weigh cell. The first alignment means thus cooperate with the carrier, through an in particular vertical raising or lowering of the weigh cell, in order to align it in the space, while, at the same time or offset in time, the centering unit cooperates with the product holder in order to lift it out of the carrier.

The alignment of the carrier carrying the product holder in the space or relative to the X-Y position of the weigh cell allows the weight force of the product holder (with or without products lying thereon) to be introduced into the load introducing section of the weigh cell precisely and without interference during the later release. For the avoidance of corner loads, as part of the release movement, it is therefore sought to move the load introducing section towards a precisely defined coupling section of the product holder. The previous precise alignment of the carrier with the first alignment means ensures that the load introducing section cooperates with the product holder at the coupling section provided and is not spaced apart to the side of it, for instance.

For the purposes of the release, the coupling of the product holder to the load introducing section is preferably effected such that the product holder merely lies loosely on the load introducing section. Through a vertical relative movement between the load introducing section and product holder, these two components can then be coupled to each other to transfer the weight force or be decoupled from each other to disengage the weight force.

Some embodiments of the invention provide that the alignment of the carrier in the space and the release of the product holder relative to the carrier is achieved as part of a (preferably continuous) relative movement between weigh cell and carrier. In the process, the weigh cell can be moved, with a part of the first alignment means secured to it or moved together with it, preferably with a bolt, from below in the Z direction towards a carrier arranged in a processing position. During the upwards movement, this part of the first alignment means comes into contact with further parts of the first alignment means, which are arranged on the carrier. As part of the upwards movement, the carrier is aligned in the X and Y direction relative to the weigh cell through this contact. As part of the alignment means, a bolt which can engage in a recess formed in the carrier is preferably secured to the weigh cell, with the result that the carrier is aligned relative to the weigh cell and thus in the space in the manner described above.

In the further upwards movement, the bolt slides further upwards through the named recess without additional interaction with the carrier, while the centering unit arranged on the load introducing section of the weigh cell moves towards the product holder arranged in the carrier from below. The centering unit engages underneath the product holder and, in the further upwards movement of the weigh cell (if necessary with the aid of suitable guide surfaces), aligns it relative to the carrier such that the product holder is lifted out of the carrier and released from the carrier. Since the alignment of the carrier and subsequently the release of the product holder can be effected as part of a single movement of the weigh cell relative to the carrier, the product delivered into the processing station can be weighed promptly. The release of the product for onward transport, thus the lowering of the weigh cell for reinsertion of the product holder into the carrier and the subsequent release of the carrier (decoupling of the first alignment means), can also be effected by a single relative movement, this time in the opposite direction, between weigh cell and carrier and can accelerate the processing process advantageously.

The relative movement between weigh cell and carrier is preferably linear, thus along a straight path. With a suitable design of the first and second alignment elements, however, a curved or otherwise suitable spatial path, along which the weigh cell is moved relative to the carrier in order to bring about the alignment and release, is also conceivable.

A conveyor in accordance with the present invention may include several carriers, wherein each carrier can receive one or more product holders. The carriers and/or their product holders are preferably provided with a mark from which, for example, the geometric properties of the respective carrier or product holder can be derived, for example via a control unit with access to a database. If the mark of the carriers or product holders is read automatically by suitable sensors along the conveyor line, an automated alignment procedure can be adapted to the product holder/carrier. This can relate to the desired upstroke of the weigh cell or of a pneumatic cylinder or of a linear drive, for example, in order to be able to specify the lifting height required for the alignment or release depending on the constructive design of the carrier or of the product holder.

In come embodiments, several carriers can be moved along the conveying path together. Several product holders, which are allocated in each case to one of the carriers, can thereby be transported simultaneously, which increases the throughput of the facility. Through suitable arrangement of several weigh cells in a processing station set up for weighing, several product holders (with or without product lying thereon) can thus also be weighed at the same time. The features described above for one carrier then also apply correspondingly to the other carriers. If the carriers enter a processing station formed for weighing, then a dedicated weigh cell with load introducing element is preferably provided there for each carrier or at least for each product holder, with the result that each weigh cell can measure the weight of the product holder of one of the carriers.

The relative movement between the respective product holder and the load introducing element or weigh cell can be effected by moving the weigh cells up or down together relative to the several product holders in the individual carriers. Alternatively, however, an individual relative movement between the respective weigh cell and the associated carrier or product holder can also be effected, which increases the flexibility of the procedure within the processing station.

Where several carriers are moved together they may be arranged next to each other in the conveying direction or transverse thereto, or in the form of a row and column matrix. Several product holders can thus be weighed quickly in a comparatively narrow space.

In some implementations of the invention, the different carriers of the conveyor and/or their product holders are each provided with a unique mark. This mark is to make it possible to identify and to individualize the carrier and/or the product holder. Specific properties of the carrier and/or of the product holder can thereby be measured and, for example, transmitted to a higher-level control in order to take them into account during the operation of the conveyor. This can, for example, relate to the empty weight (tare). Every product holder has such an individual empty weight, which is to be taken into account during the weighing. The individual mark makes it possible to determine the empty weight of the respective product holder for this purpose. The empty weight can be contained directly in the mark itself or be determined, using the mark, from a database which establishes the relationship between the mark and the empty weight.

The mark can be non-variable identification means, such as for example a barcode or a number or a fixed RFID mark. Alternatively or in addition, the mark can also be variable, for instance in order to store specific, possibly also variable, properties of the carrier or product holder directly in the mark. For example, a code for the empty weight of a product holder could be stored in a memory arranged on the product holder as a mark or part of a mark. If the mark is read in the process, a control unit controlling the process obtains data about the empty weight of the product holder directly from the mark in order to take this into account during the weighing.

Variable marks have the advantage that they document changes in the carrier or the product holder directly on the component itself, without a special database having to be edited for this purpose. If, for example, the empty weight of a (then unloaded) product holder is determined by means of one or more weighing procedures, then a code representing this value can be written directly into the variable mark on the product holder. As part of a regular weighing process with product lying on the product holder, the empty weight can be determined by reading the mark and subtracted from the total weight determined by the weigh cell, in order to obtain the product weight (net).

Alternatively, of course, the empty weight can also be stored in a database, from which the control unit allocates the empty weight via the mark identified on the product holder. Any other desired properties of a carrier or product holder (geometric dimensions, material properties, time or location data etc.) can also be stored directly in the mark or a database, which allocate the properties to the mark.

It is further conceivable to allocate the properties of several carriers and/or product holders to a common mark, for instance when several carriers are coupled to form a group and are moved along the conveyor line together. Then, properties of the individual carriers and/or of the product holder associated with each carrier could be stored in the common mark or allocated to it. Using the mark, a distinction is then to be possible between the individual carriers or product holders, in order to be able to read or derive from the mark the property of a particular product holder or carrier within the group. Thus, a group formed, for example, of four carriers each with one product holder could have a common, writable RFID chip. Data for each carrier and/or product holder can be stored in the chip. The reading and writing of such a memory are then simplified since only one mark needs to be read for all four carriers or product holders. Only one read unit or write unit then needs to be provided to read data for a control unit or to store it in the memory of the RFID chip for all four carriers or product holders. Other readable and/or writable identification means sufficiently known to a person skilled in the art are also conceivable for identifying one or more carriers or product holders and for making the allocation of specific properties possible.

The material of the product holder is preferably suitable for X-ray radiography. Then, the product holder and a product lying on the product holder can be radiographed by means of X-rays in order to be able to detect any foreign bodies contained therein. It is also possible to measure a fill quantity of a product when the intensity of the X-radiation is influenced by the fill level, for instance in the case of a filled yoghurt pot lying on the product holder. In general, the radiographable product holder is to make it possible to measure fill quantities, fill levels or nominal fill quantities with the aid of X-ray radiography. Monitoring the fill level or tests for foreign bodies possibly contained in the product can be carried out in an X-ray inspection unit arranged along the conveyor line, which can be arranged upstream or downstream of a processing station formed as a weighing station.

A conveyor according to the invention preferably comprises at least one weighing station with at least one weigh cell, in order to measure weight forces in the manner described above.

The process for releasing a product holder in the device described above may comprise the following steps:
a) moving a carrier with a product holder received therein into the processing position,
b) aligning the carrier by means of first alignment means into a target carrier position,
c) moving (releasing) the product holder and the carrier relative to each other in order to disengage the product holder from the carrier and to introduce the weight force of the product holder, loaded with product or unloaded, into the load introducing section of a weigh cell.

The carrier preferably reaches the processing position in a substantially horizontal movement (X-Y plane). However, that does not rule out this movement also comprising a Z component, for instance when the conveying path is directed upwards or downwards. In the processing position, in which the empty product holder or one carrying a product is to be weighed, the carrier rests substantially fixed in position in relation to its X and Y coordinates. Small displacement possibilities exist in the X and/or Y direction, however, in order to be able to position the carrier precisely, with regard to its desired X-Y position, in the presettable target carrier position with the aid of the first alignment means.

The release of the product holder relative to the carrier may be effected perpendicularly to the X-Y plane by lifting the product holder out of the carrier. This can be downstream of the positioning of the carrier in the target carrier position. However, the two positioning procedures preferably overlap in order to save time. The release of the product holder relative to the carrier can even already be finished while the carrier is still being transferred into the target carrier position by the first alignment means. It is also conceivable to already bring the second alignment means into engagement on or with the product holder before the first alignment means interact with each other. Accordingly, the product holder could already be lifted out of the carrier by an amount before the carrier itself is aligned. The release of the product holder is then effected at the latest as part of the transfer of the carrier into the target carrier position, since the positioning of the carrier in the X-Y direction hereby produces enough lateral spacing from the product holder for weighing without force shunt.

The alignment of the carrier and the release of the product holder are preferably effected within a continuous relative movement between weigh cell on the one hand and carrier or product holder on the other hand, most preferably as part of a purely vertical and/or straight upwards movement of the weigh cell (through the formation of suitable alignment elements, relative movements inclined with respect to the X, Y spatial axes can also make the alignment of the carrier and, respectively, the release of the product holder possible).

In processes according to the present invention, first alignment elements arranged on the weigh cell, such as a vertical bolt for example, may engage, as part of this movement, in a recess in the carrier provided for this purpose and bring about the horizontal alignment of the carrier through suitable contact surfaces. As part of the upwards movement, second alignment elements arranged on the load introducing section of the weigh cell cooperate with suitable contact surfaces on the product holder in order to align it relative to the carrier and thus to be able to achieve the release within a single movement of the weigh cell.

After the product holder has been released from the carrier, the product holder rests exclusively on the load introducing section of the weigh cell, with the result that the weight of the product holder can be measured. By reversing the releasing movement, the product holder comes back into engagement with the carrier and can, after any remaining couplings of first or second alignment elements are disengaged, be moved further in the conveying direction in order to be able to transfer a subsequent carrier into the processing position.

These and other advantages and features of the invention will be apparent from the following description of representative embodiments, considered along with the accompanying drawings.

DESCRIPTION OF REPRESENTATIVE EMBODIMENTS

Figure 1:
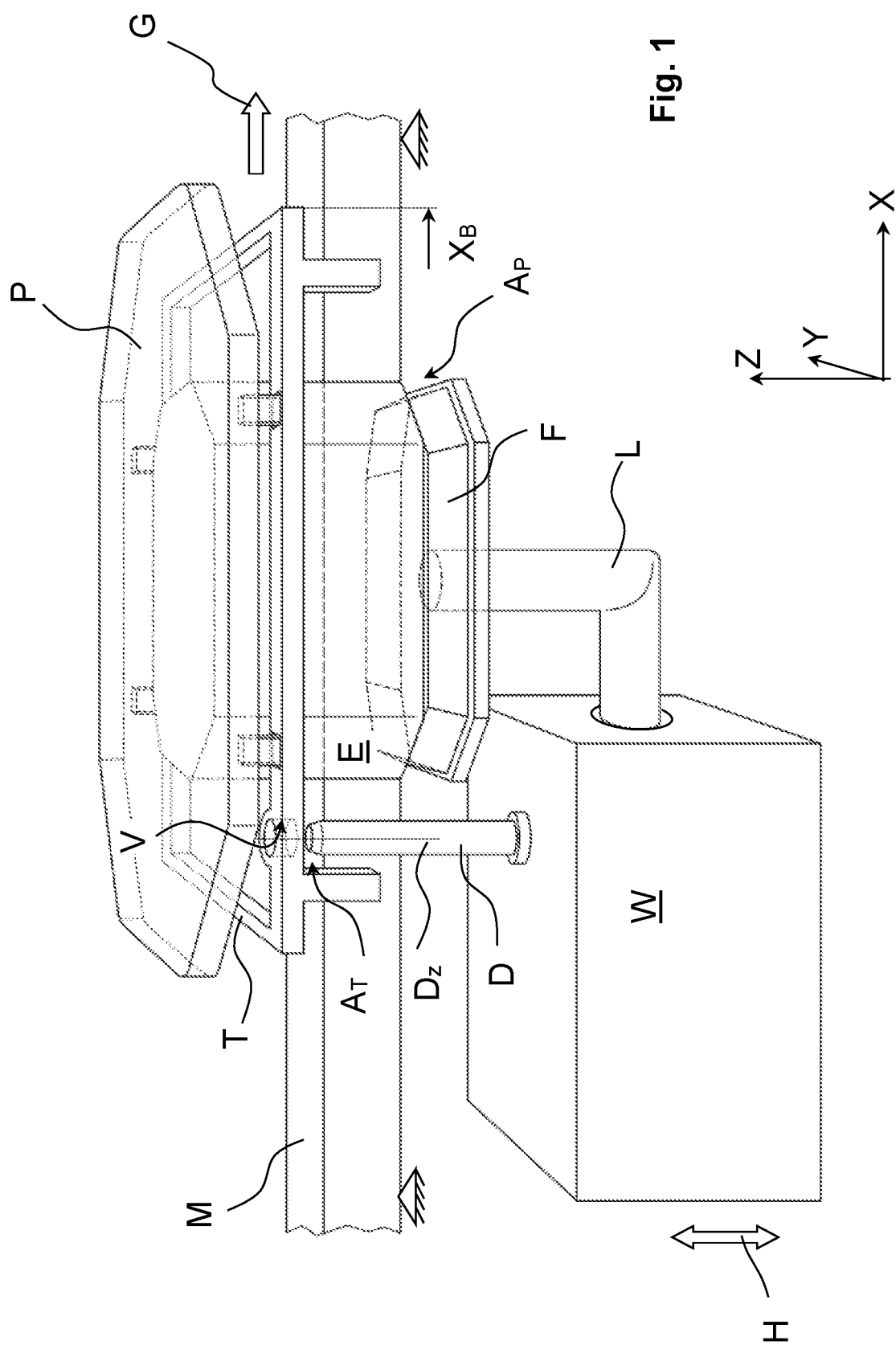
FIG. 1 is a simplified perspective view of a device embodying principles of the invention with a carrier in a processing position.

FIG. 1 shows, in a simplified perspective view, the essential components of a conveyor according to the invention. A carrier T is movable in a conveying direction G along a fixed conveying element M formed as a rail. The carrier T carries a product holder P on which a product R (shown only in the side views of FIGS. 2-4) can lie in order to move the product R along a production line. The product holder P can be lifted out of the carrier T upwards in the Z direction. Not represented in more detail are driven conveying members (for example drivers, chain links or hooks), which can displace the carrier T along the conveyor element M.

A schematically represented weigh cell W is arranged underneath the conveyor element M. The weigh cell W comprises an angled load introducing section L, which itself carries a centering unit F, which is positioned substantially underneath the base E of the product holder P. Via the load introducing section, the weight of the product holder P can be introduced into a weighing mechanism (not represented in more detail) in the weigh cell W in order to generate an analyzable weighing signal therefrom. All weighing mechanisms known to a person skilled in the art, also independently of the present examples in the figures, can be used to generate the weighing signal, wherein the principle of electromagnetic force compensation is to be mentioned in particular.

Figure 2:
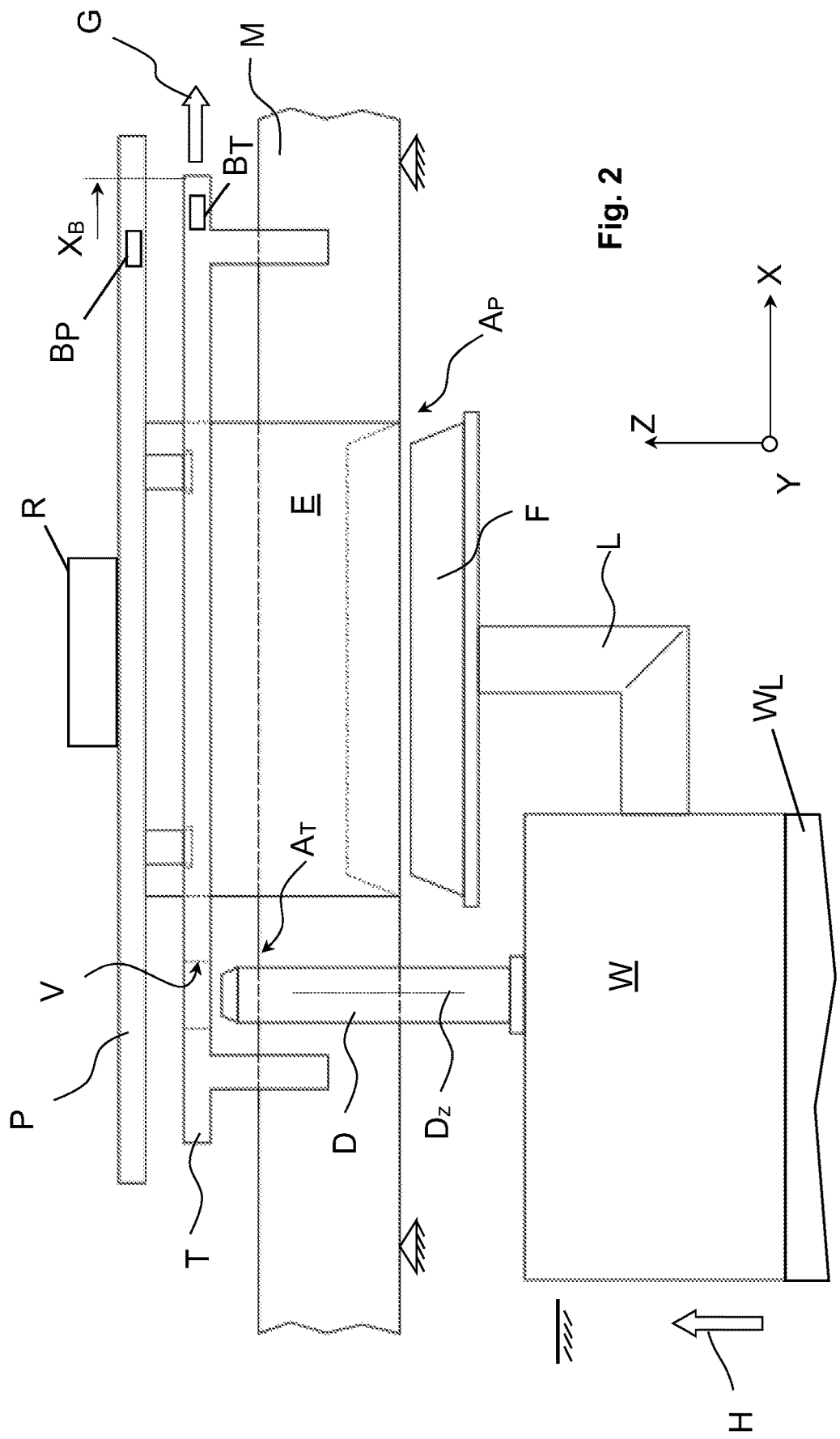
FIG. 2 is a side view of the device shown in FIG. 1 with the carrier in the same position as that shown in FIG. 1.
Figure 3:
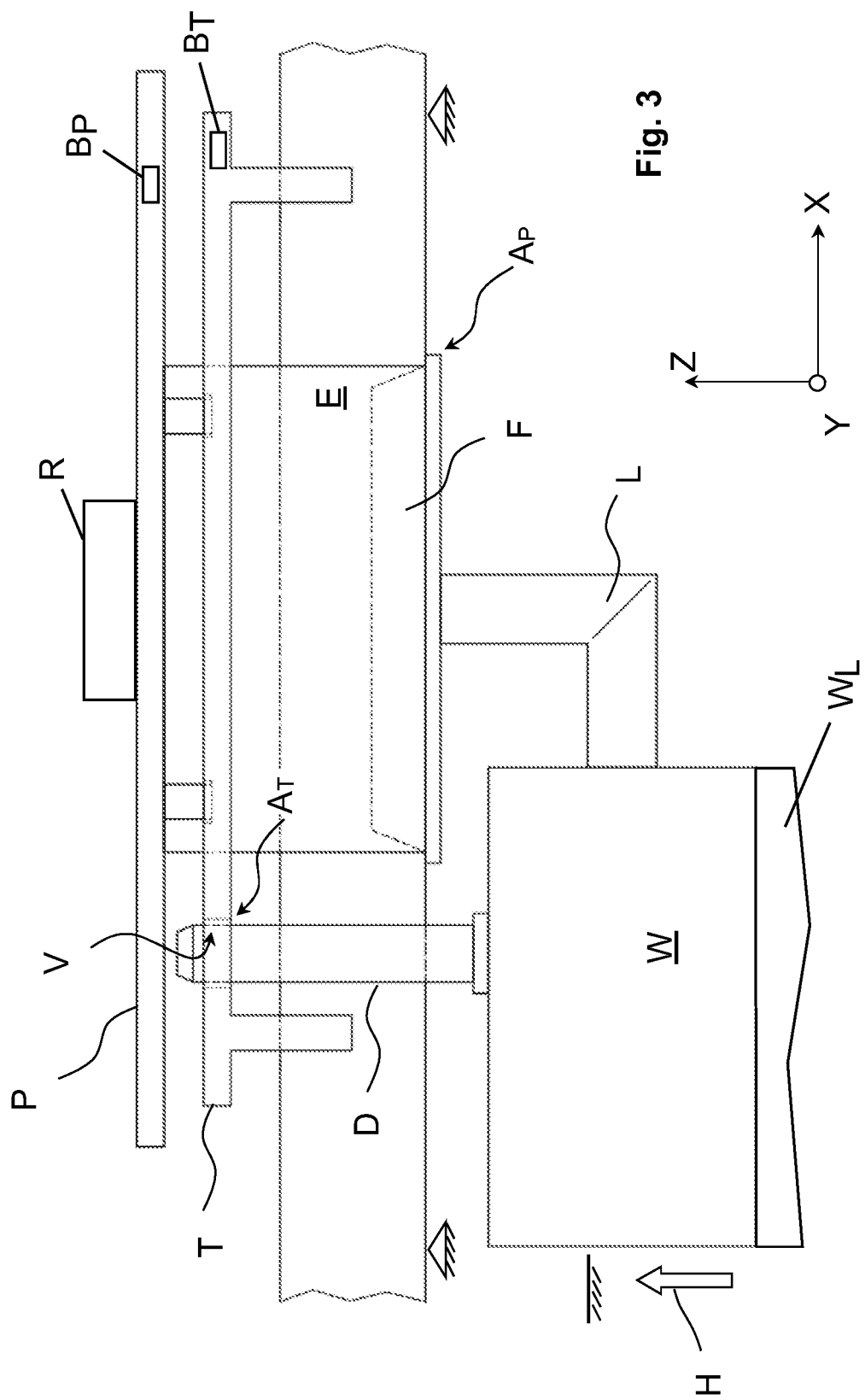
FIG. 3 is a side view similar to FIG. 2 but with the weigh cell and elements mounted thereon in a second position relative to the carrier.
Figure 4:
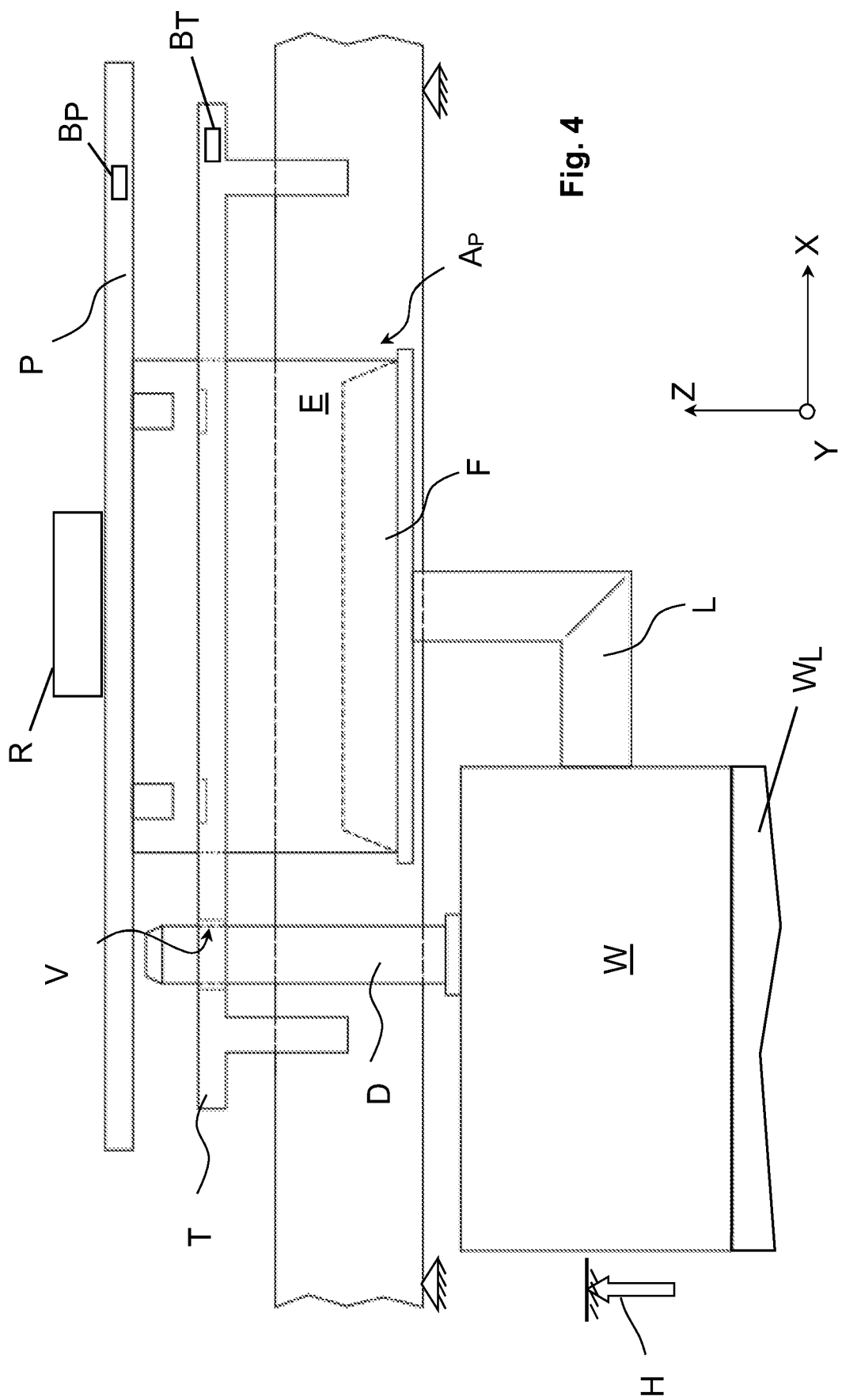
FIG. 4 is a side view similar to FIG. 2 but with the weigh cell and elements mounted thereon in a third position relative to the carrier.

The weigh cell W can be moved upwards and downwards in a lifting direction H, and thus relative to the conveying element M, via a lifting mechanism $W_L$ (shown only in the side views of FIGS. 2-4). In this embodiment example, the lifting direction H coincides with the vertical Z axis.

In FIG. 1, the carrier T has reached a processing position $X_B$ along the conveying element M and rests there at first. Within this processing position $X_B$, the carrier T has to be transferred into a target carrier position which is precisely presettable in particular through its X and Y coordinates. This is necessary in order to be able to ensure the release of the product holder P from the carrier T. For this purpose, the device has first alignment means $A_T$, which is formed partly on the carrier T and partly on the weigh cell W. In this example the portion of the first alignment means formed in the carrier T comprises an alignment opening V in the form of a hole on the carrier, the axis of opening V running in the Z direction. Underneath the carrier arranged in the processing position and on the top of the weigh cell W, a cylindrical bolt D is formed about an axis $D_Z$, which also extends in the Z direction and comprises the portion of the first alignment means formed on the weigh cell W. The external diameter of the bolt D is chosen slightly smaller than the internal diameter of the alignment opening V. At its upper end, the bolt D is provided with a conical section, which makes threading into the alignment opening V easier and at the same time brings about the alignment of the carrier T relative to the bolt in the X-Y plane.

In the present example, the centering unit F has a pyramid section with conically tapering outer surfaces at its upper end. These are part of second alignment means $A_P$, with which the product holder P is released from the carrier T. The base E of the product holder P is open at the bottom and designed with inner surfaces (shown best in FIGS. 2-4 as the hidden lines in base E), which also form part of the second alignment means $A_P$. By raising the centering unit F into the base E of the product holder P from below, the inner surfaces of the base come into contact with the pyramid section, whereby the base is initially aligned in the horizontal direction (X-Y plane) relative to the centering unit F and thus to the weigh cell W. With a continued upwards movement of the centering unit F, the latter eventually engages underneath the base E in a positive-locking manner. Then, a further movement of the product holder P relative to the centering unit F is no longer possible and the product holder P is lifted out of the carrier T by the centering unit, raised further with the weigh cell.

The spatial arrangement of the weigh cell W with the bolt D and the centering unit F is chosen such that, in a substantially straight, preferably continuous upwards movement of the weigh cell W, first of all the carrier T is aligned via the bolt D and then the product holder P is lifted out of the carrier T such that the product holder P lies on the load introducing section L without force shunt and thus introduces its full weight into the weigh cell W. The arrangement of the bolt D and the centering unit F with respect to each other thus also determines the position of the carrier T relative to the product holder P at the moment of the release. In the following figures, the alignment or release is illustrated with schematic side views.

FIG. 2 shows how the weigh cell W is raised in the direction H relative to the conveying element M with the carrier T resting on it and the product holder P in turn resting thereon. The bolt D is on the verge of engaging in the alignment opening V of the carrier T. The centering unit F is not yet in contact with the base E of the product holder P.

In FIG. 3 it can be seen how the weigh cell has been moved further upwards, wherein the bolt D has been pushed into the alignment opening V and through it. The carrier T has thereby taken up a precisely defined X-Y position relative to the bolt D or the weigh cell W, and thus also relative to the centering unit F. Meanwhile, the centering unit F has come into contact with the inner sides of the base E of the product holder P from below, whereby the product holder P has also taken up a precisely preset X-Y position relative to the weigh cell W. However, the product holder P is still resting at least partly on the carrier T.

FIG. 4 shows that the weighing machine W has been fully raised in the vertical direction H. Here, the bolt D has been pushed further through the alignment opening V without altering the X-Y position of the carrier further. Meanwhile, the centering unit F has engaged fully underneath the base E of the product holder P and lifted the product holder P out of the carrier T. The product holder P thus rests exclusively on the load introducing section L of the weigh cell W, with the result that the weight of the product holder (with or without product lying thereon) can be measured by the weigh cell. During the weighing procedure, the carrier T is secured in the horizontal direction by the bolt D, with the result that, in the subsequent downwards movement of the weigh cell W (not represented in more detail), the product holder P can be inserted back into the carrier T in order to transport it further.

Figure 5:
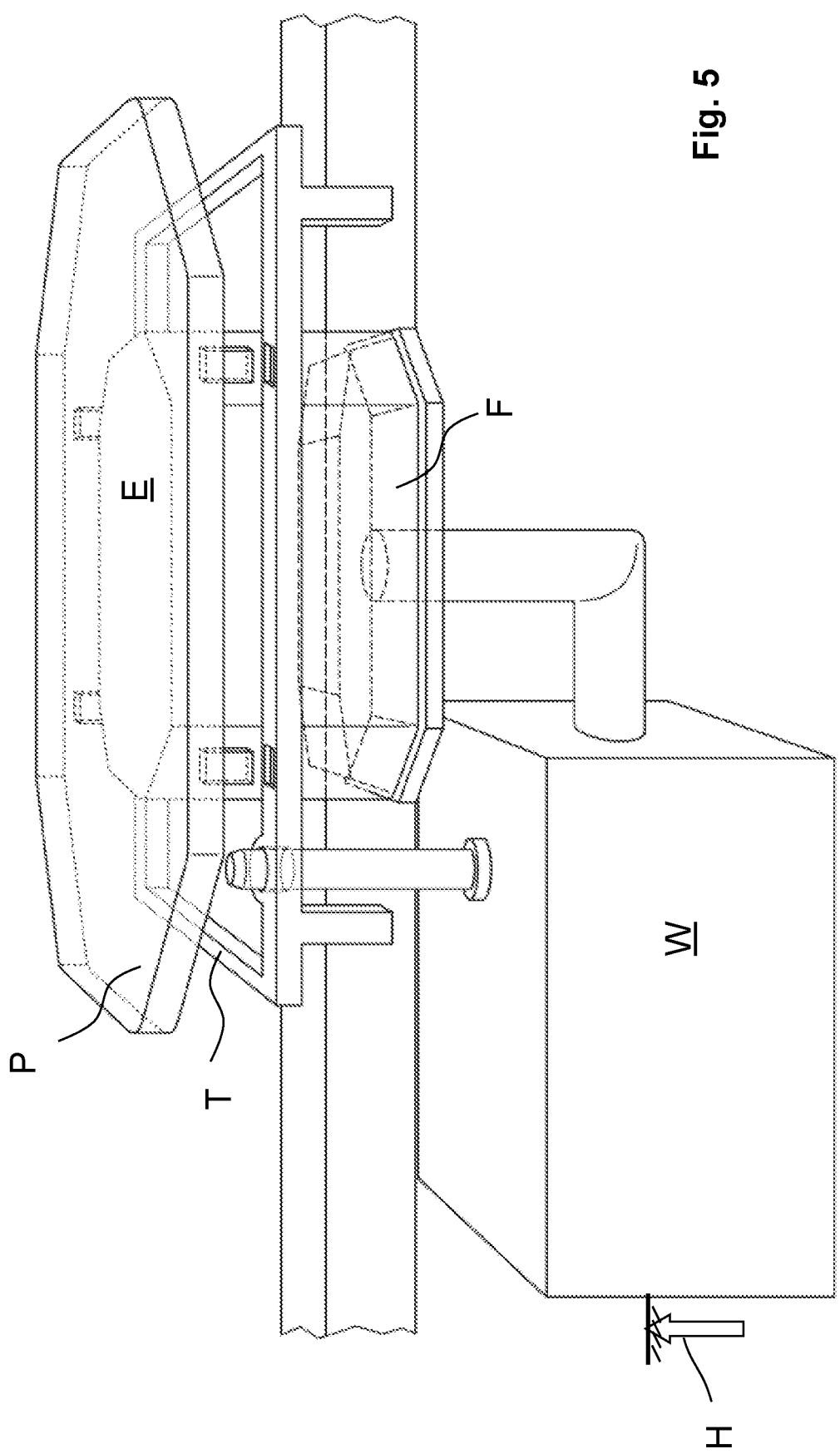
FIG. 5 is a simplified perspective view similar to FIG. 1 but showing the weight cell and elements mounted thereon in the same position relative to the carrier as shown in FIG. 4.

FIG. 5 shows the situation according to FIG. 4 in a simplified perspective view.

FIGS. 2-4 also show that both the carrier T and the product holder P may include a mark as described above in the summary section. In particular, the carrier T includes a mark shown schematically at $B_T$, while product holder P includes a mark shown schematically at $B_P$.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

Any use of terms indicating orientation, position, or relative position such as "up," "down," "above," and "below" for example, are made with reference to the orientation of the drawings.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE CHARACTERS $A_P$ second alignment means
$A_T$ first alignment means
$B_P$ mark on product holder P
$B_T$ mark on carrier T
D bolt
$D_z$ axis of the bolt
E base of the product holder P
F centering unit
G conveying direction
H vertical direction
L load introducing section
M conveying element
P product holder
R product
T carrier
V alignment opening
W weigh cell
$W_L$ lifting mechanism
X, Y, Z spatial coordinates
$X_B$ processing position

The invention claimed is:

1. A conveyor for transporting products, the conveyor including:
   (a) a product holder adapted to receive at least one product;
   (b) a carrier adapted to receive the product holder in a supported position;
   (c) a conveying element operable to move the carrier and product holder received on the carrier in a horizontal conveying direction to a processing position which is defined within tolerances with respect to the conveying direction and with respect to a horizontal transverse direction extending perpendicular to the conveying direction;
   (d) first alignment means for aligning the carrier in the conveying direction, or the transverse direction, or both the conveying direction and transverse direction relative to the conveying element or a fixed component of the conveying element, to thereby transfer the carrier from the processing position to a target carrier position; and
   (e) second alignment means for aligning the product holder in a target product holder position which is defined in the conveying direction and the transverse direction, the second alignment means including alignment surfaces on the product holder which are configured to mate with surfaces of a centering unit which is moveable relative to the carrier.

2. The conveyor of claim 1 wherein the first alignment means comprises a movable alignment element which is movable to impinge on the carrier in the processing position to displace the carrier into the target carrier position.

3. The conveyor of claim 2 wherein the movable alignment element comprises a bolt extending along a longitudinal bolt axis, the bolt being movable to contact guide surfaces of the carrier in order to displace the carrier into the target carrier position.

4. The conveyor of claim 3 wherein the bolt is fixed in position with regard to the conveying direction and the transverse direction and wherein the carrier in the processing position is movable in the conveying direction, or the transverse direction, or both the conveying direction and transverse direction.

5. The conveyor of claim 1 further including a weigh cell having a load introduction section supporting the centering unit, the weigh cell being operable to measure the weight of the product holder and any product received thereon when the product holder is released from the carrier.

6. The conveyor of claim 5 wherein the load introducing section is moveable relative to the product holder in a vertical direction perpendicular to both the conveying direction and the transverse direction until the weight force of the product holder and any product supported on the product holder is released from the carrier and introduced into the load introducing section.

7. The conveyor of claim 6 further including a lifting mechanism operable for moving the weigh cell, load introducing section of the weigh cell, and centering unit in the vertical direction until the product holder and carrier are separated from each other and the weight force of the product holder and any product supported thereon is received by the load introducing section of the weigh cell.

8. The conveyor of claim 7 wherein the first alignment means includes a bolt which is coupled to the weigh cell such that the bolt is movable together with the weigh cell in the vertical direction.

9. The conveyor of claim 8 wherein the alignment of the carrier or the release of the product holder is carried out as part of a continuous relative movement between the weigh cell and carrier in a straight lifting movement of the weigh cell relative to the carrier and substantially fixed in the plane of the conveying direction and transverse direction.

10. The conveyor of claim 1 further including at least one additional carrier, each additional carrier being associated with a respective additional product holder, and wherein the conveying element is operable to move the carrier and each additional carrier along the conveying direction individually or together.

11. The conveyor of claim 10 wherein the carrier and each additional carrier and the product holder and each additional product holder is provided with a unique machine-readable mark, via which individual data can be allocated to the respective carrier or product holder.

12. The conveyor of claim 1 wherein the product holder is formed from a material suitable for X-ray radiography such that foreign bodies contained in the product or a fill quantity of the product received on the product holder, or both, are detectable by X-ray radiography of the product holder and the product received on the product holder.

13. A weighing station including:
   (a) a product holder adapted to receive at least one product, the product holder including product holder alignment surfaces;
   (b) a carrier adapted to receive the product holder in a supported position;
   (c) a conveying element operable to move the carrier and product holder received on the carrier in a horizontal conveying direction to a processing position which is defined within tolerances with respect to the conveying direction and with respect to a horizontal transverse direction extending perpendicular to the conveying direction;
   (d) first alignment means for aligning the carrier in the conveying direction, or the transverse direction, or both the conveying direction and transverse direction relative to the conveying element or a fixed component of the conveying element, to thereby transfer the carrier from the processing position to a target carrier position;
   (e) a centering unit which is moveable relative to the carrier, the centering unit including centering surfaces which are configured to mate with the product holder alignment surfaces; and
   a weigh cell having a load introduction section supporting the centering unit, the weigh cell being operable to measure the weight of the product holder and any product received thereon, when the carrier is in the target carrier position and the product holder is released from the carrier by movement of the centering unit relative to the carrier.

14. A process including:
   (a) moving a carrier with a product holder received thereon along a horizontal conveying direction into a processing position for the carrier which is defined within tolerances with respect to the conveying direction and with respect to a horizontal transverse direction extending perpendicular to the conveying direction;
   (b) placing a first alignment element and the carrier in a contact position relative to each other to align the carrier in the conveying direction, or the transverse direction, or both the conveying direction and transverse direction to thereby transfer the carrier from the processing position to a target carrier position;

(c) moving the product holder and the carrier relative to each other in order to release the product holder from the carrier and to introduce the weight force of the product holder and any product received thereon into a load introducing section of a weigh cell; and (d) wherein moving the product holder and the carrier relative to each other includes moving a centering unit relative to the product holder to bring centering surfaces of the centering unit into contact with alignment surfaces of the product holder to place the product holder in a target product holder position, and wherein the centering unit is supported on the load introducing section of the weigh cell.

15. The process of claim 14 wherein the first alignment element is coupled to the weigh cell and wherein the alignment of the carrier and the release of the product holder are both effected as part of a relative movement between weigh cell and the carrier in a lifting movement of the weigh cell relative to the carrier.

16. The process of claim 14 further including one of:

(a) identifying the carrier using a carrier mark located on the carrier, and determining data relating to the carrier directly or indirectly from the carrier mark, and aligning the carrier in the target carrier position using the data relating to the carrier; and (b) identifying the product holder using a product holder mark located on the product holder, and determining data relating to the product holder directly or indirectly from the product holder mark, and aligning the product holder in the target product holder position using the data relating to the product holder.

17. The process of claim 14 further including weighing the product holder one or more times and storing data resulting from each weighing in a database or a writeable memory device located on the product holder or the carrier.

* * * * *